Sept. 30, 1958 W. F. SCOTT ET AL 2,854,297
SUPPORT ASSEMBLY
Filed May 2, 1955 2 Sheets-Sheet 1

Inventors
William F. Scott &
Arthur W. Vonderhaar
by Wilkinson, Huxley, Byron & Hume
Attorneys Sept. 30, 1958 W. F. SCOTT ET AL 2,854,297
SUPPORT ASSEMBLY
Filed May 2, 1955 2 Sheets-Sheet 2

Inventors
William F. Scott &
Arthur W. Vonderhaar
by Wilkinson Huxley Byron & Hume
Attorneys 2,854,297
Patented Sept. 30, 1958

United States Patent Office 2,854,297

SUPPORT ASSEMBLY

William F. Scott and Arthur W. Vonderhaar, Newton, Iowa, assignors to The Maytag Company, Newton, Iowa, a corporation of Delaware Application May 2, 1955, Serial No. 505,251

13 Claims. (Cl. 308—145)

This invention relates to a support assembly in which an umbrella-like member journalling a rotatable shaft in a vertical position is resiliently centered on a mating dome-like base member to permit nutational as well as rotary movements to be imparted to the shaft which supports and rotates a member attached to its upper end.

The invention illustrated in the accompanying drawings cooperates with and serves as a tiltable support for the drive mechanism forming the subject matter for the John D. Goodlaxson application filed May 2, 1955, and bearing the Serial No. 505,231 and assigned to the same assignee as the instant application.

In the aforesaid Goodlaxson application, the drive assembly supported by the instant support mechanism includes two concentric shafts, one of which is a power input shaft receiving its power through a pulley driven by a reversible motor. With that construction it is possible to rotate the pulley in one direction to impart movement only to the power input shaft while the second concentric shaft is restrained against rotation by a braking device. However, when the pulley is rotated in the opposite direction, it climbs a helix carried on the power input shaft to engage and move a clutch member which not only releases the braking engagement on the second shaft but also drives the second shaft in unison with the power input shaft.

As the braking device of the Goodlaxson application is secured to the support mechanism forming this invention, it is one of the prime objects of this invention to provide a support mechanism which will permit nutational movements of these concentric output shafts while at the same time serving as an anchoring device to prevent rotation of the outer concentric shaft or its support during the braking operations.

A further object of this invention is to provide a support mechanism in which the weight carried by the vertically positioned shaft supported by the umbrella member will be used to an advantage to produce an ample frictional force between this umbrella member and its supporting dome member to dampen the nutational movements of the support shaft and its driven assembly.

An additional object of this invention is to provide a tiltable support for a vertical shaft and its driving pulley so that the pivotal point of the shaft during its nutational movement on the tiltable support lies below the shaft's point of support and on a point determined by the intersection of the pulley's axis of rotation with the horizontal plane bisecting the groove of the pulley.

Another object of this invention is to provide a support mechanism which is capable not only of positioning and supporting a shaft in a vertical position and allowing both rotary and nutational movements to be imparted to the shaft so supported but also one which is capable of regulating the degree of damping of the shaft's gyrations relative to the support mechanism itself.

A further object is to provide a support assembly having an invaginated conical base portion capable of supporting a shaft in a vertical position for nutational movements about a vertical axis while serving as an anchoring means for the assembly supporting the shaft in that vertical position.

Other objects, advantages and features of this invention will be more apparent when reference is made to the following specifications and drawings in which.

Figure 1:
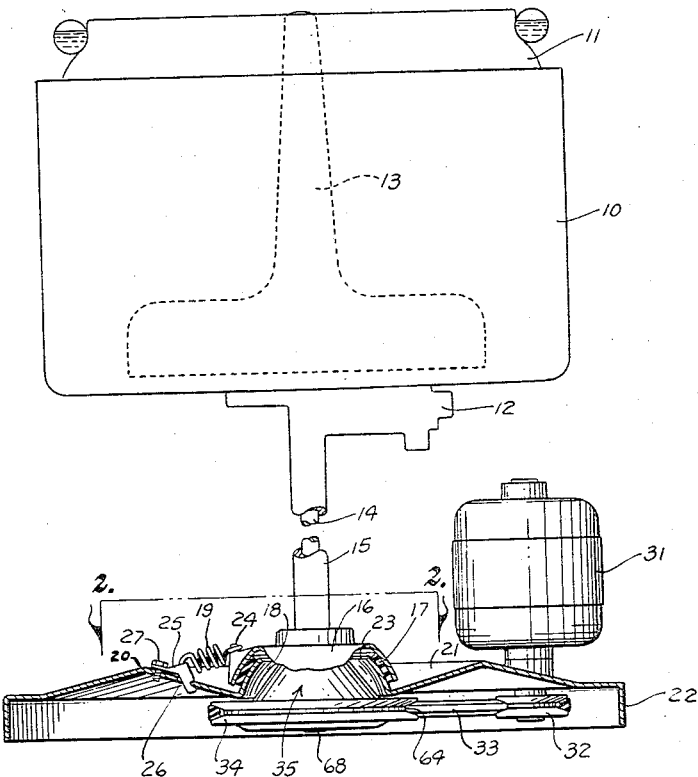
Figure 1 is an elevation, partially in section, of a washing machine embodying the support mechanism forming this invention.
Figure 2:
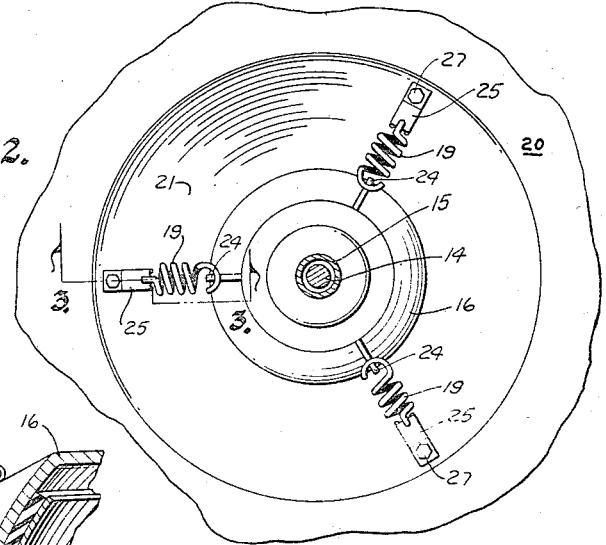
Figure 2 is an enlarged view, partially in section, taken on line 2—2 of Figure 1.
Figure 3:
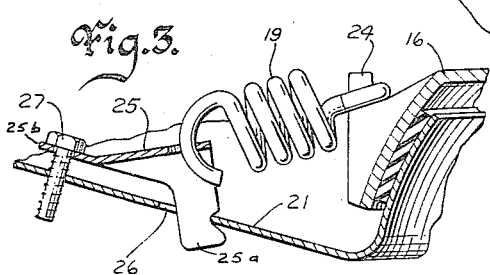
Figure 3 is a cross sectional view taken on line 3—3 of Figure 2.

The general organization of a vertical axis type washing machine embodying our tiltable support may be understood by reference to Figure 1.

In that figure outer tub 10 and its inner basket 11 are integrally connected to casing 12 which houses a motion converting mechanism driving agitator 13. The double tub assembly thus formed from tub 10 and basket 11 is restrained against rotation during the agitation period when rotation of power shaft 14 is converted into an oscillatory movement by the motion converting mechanism within casing 12 to drive agitator 13 in a conventional manner. During the spin periods of the washing cycle, casing 12, attached to its supporting tube or shaft 15, is permitted to rotate with shaft 14 to rotate the tub assembly and centrifugally extract moisture from the fabrics carried within the tub assembly.

In this invention the outer shaft or tube 15 is journalled in an umbrella-like member 16 resiliently centered on friction pads 17 of mating dome 18 by the three equally spaced springs 19. Supporting dome 18 rises from the bottom of the shallow concave depression 21 located in the central portion of support cone 20 formed in base member 22. Through the use of this invaginated support cone 20 dome 18 is in effect supported by depression 21 without the need of additional support from any reinforcing cross members beneath base 22. Dome 18 is provided with an opening 23 at its uppermost portion permitting shafts 14 and 15 and a portion of their drive mechanism to extend through base member 22.

The periphery of umbrella member 16 is provided with three ears 24 to which the three springs 19 are respectively attached. Each of these springs is attached to the vertex of an L-shaped bracket member 25 having a first pair of notched bifurcated legs 25a fitted into a rectangular opening 26 in base 22 and a second leg 25b fastened to base member 22 by means of an adjustable anchor screw 27 threaded into that base member. This constructional arrangement not only centers and restrains umbrella member 16 against rotation but also regulates the degree of dampening of the gyratory movements imparted to shafts 14 and 15 by controlling the frictional forces between umbrella member 16 and friction pads 17.

Base member 22 also supports the reversible motor 31 which is mounted on the top side of base member 22 and which drives its attached power pulley 32 beneath the base member 22. Pulley 32 is connected by V-belt 33 to the power input pulley 34 of the drive assembly generally indicated by the arrow 35. Through the use of the drive assembly shown in Figure 4 and disclosed in the Goodlaxson application, the direction of rotational movement imparted by reversible motor 31 to pulley 34 determines whether one or both of shafts 14 and 15 are to be rotated.

Figure 4:
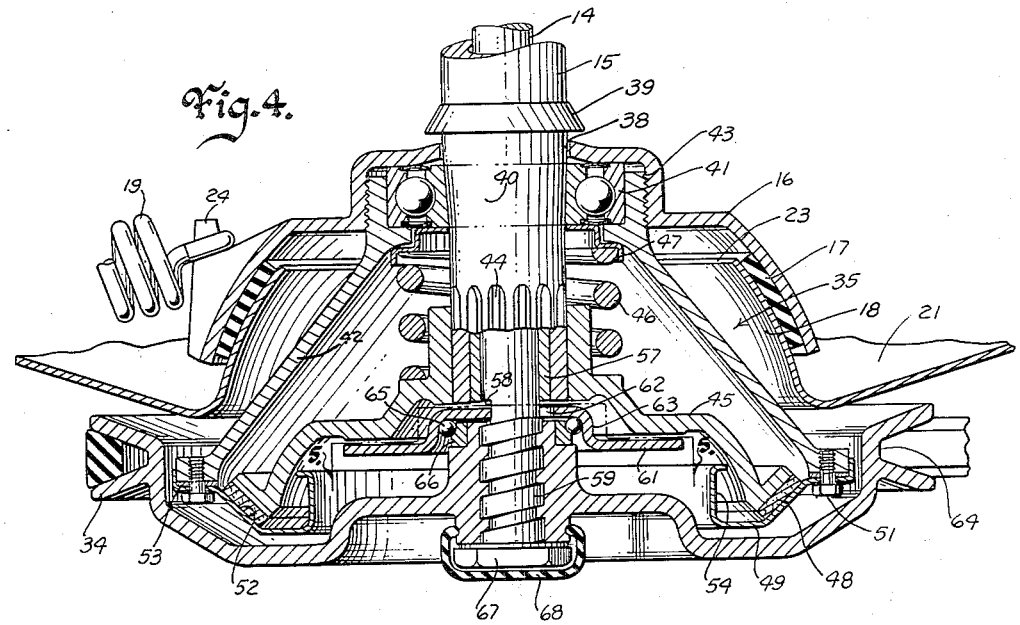
Figure 4 is an elevation, mostly in section, showing the cooperation between our support mechanism and a drive assembly supported thereby.

Referring briefly now to the details of the drive assembly as shown in Figure 4, it can be seen that both of the shafts 14 and 15 pass freely through opening 38 at the top of umbrella member 16 and terminate below base member 22. Deflector seal 39 fitted around tube 15 prevents oil, water, etc., which may possibly drain down tube 15 from working into the parts of the drive assembly and impairing its operation.

While the connections of shaft 14 within casing 12 prevent axial movements of the shaft relative to its concentric tube 15, tube 15 is maintained in its vertical position solely by means of its support on umbrella member 16. With this construction the weight of the tub assembly so supported may be used to an advantage to produce a frictional force between umbrella member 16 and the friction pads 17 to aid in dampening the gyratory movements of shafts 14 and 15. To accomplish this end, shaft 15 is provided with a tapered portion 40 seated in the mating tapered inner race of thrust bearing 41. The outer race of bearing 41 is gripped between umbrella member 16 and stator support member 42 by means of righthand threads 43 holding these two latter members together in an integral unit. Though members 16 and 42 have been threaded into each other in this embodiment for apparent manufacturing and servicing advantages and to produce more uniform torsional loading between these parts during braking periods, they may be fastened together by various other methods without changing the primary functions of either part.

As apparent from Figure 4, the lower end of tube 15 is provided with splines 44 which fit into rotor member 45 and allow the latter member to move relative to shaft 15 in an axial direction only. Rotor 45 is urged downwardly by a large coil spring 46 encircling shaft 15 and abutting rotor 45 and a spring retainer member 47 which in turn presses upwardly against the inner race of thrust bearing 41.

Spring 46 moves rotor 45 downwardly until brake lining 48, cemented to the bevelled edge of rotor 45, engages brake stator 49 which is fastened to stator support member 42 by means of cap screws 51 threaded into the latter member. Use of these mating bevelled rotor and stator parts produces a higher unit loading on lining 48 for a given size spring than would be achieved through the positioning of these same parts in a horizontal plane. Stator 49 presents a stationary brake surface 52 to rotor 45 and serves as a reservoir for a small quantity of lubricating fluid in case it is desired to use a lubricated rather than a dry brake lining. Sealing gasket 53 and the annular flange 54 prevent the escape of this small quantity of lubricating fluid whenever a machine utilizing this drive assembly is tipped over on its side.

Fitted within the lower end of tube 15 is a bushing 57 which journals the power shaft 14 extending beyond the lower end of shaft 15. This lower extension of shaft 14 is provided with a flat 58 and a helix 59 which approach but do not merge into each other.

Figure 5:
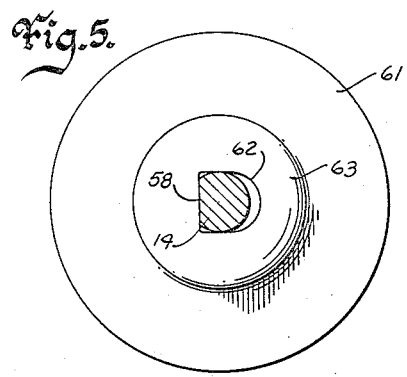
Figure 5 is an enlarged cross section taken on line 5—5 of Figure 4.
Figure 6:
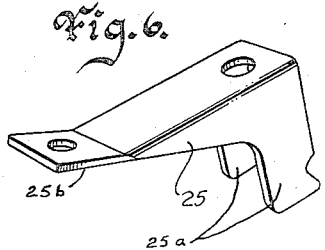
Figure 6 is a perspective view of one of the brackets connected between a centering spring and the base frame to regulate the degree of dampening of the shafts mounted on the support mechanism.

Clutch member 61, which has a D-shaped opening 62 in its raised central portion 63, slides over helix 59 and, when moved laterally of shaft 14 and centered with respect to that shaft, is free to move axially of that shaft while being restrained against rotation relative to that shaft by flat 58. (Note Figure 5.)

Pulley 34, which is powered through V-belt 33 by means of the reversible motor 31, is threaded on helix 59 to permit its vertical travel on shaft 14 as determined by the direction of rotational movement imparted to it by motor 31.

Driven pulley 34 is contoured to cover and protect the rotor and stator structure and also to provide a V groove 64 lying in the same plane as the pivot point for shaft 14. It should be noted that while shaft 15 and its inner shaft 14 are supported by dome member 18, these concentric shafts actually pivot on a point determined by the intersection of the radii of curvature of this dome. In this modification, this point is also the intersection of the shafts' axis of rotation with the horizontal plane bisecting the V groove 64 to minimize changes in belt tension during the gyratory movements of the shafts. Since reversible pulley 34 is permitted to travel a slight degree on its vertical axis in the illustrated drive assembly, it should be apparent that the location of this point is approximate with reference to the plane through groove 64.

The central portion 63 of clutch members 61 serves as the outer race for balls 65 which permit relative rotary movement between clutch member 61 and pulley 34 while a hardened insert 66 fitted on the hub of pulley 34 provides the inner race for these balls.

Pulley 34 is prevented from turning itself off the bottom of shaft 14 by a left hand cap screw 67 threaded into the lower end of shaft 14. With this construction a spiral movement of pulley 34 downwardly against cap screw 61 tends to tighten screw 67 into shaft 14. Resilient seal 68 provides a means for keeping foreign matter out of the helix 59 and the space between the abutting surfaces of sheave 34 and screw 67.

In operation when no power is supplied to the drive assembly described, the parts assume the position shown in Figure 4. In this position outer shaft 15 is held in a braked position as rotor 45, splined to shaft 15, is urged against stator 49 by the large coil spring 46. Since stator member 49 is in effect an integral part of umbrella member 16 which cannot rotate due to the anchoring action of centering springs 19, shaft 15 may only nutate on friction pads 17 of dome 18.

During the agitation period when motor 31 rotates pulley 34 in a counterclockwise direction as viewed from the bottom of the drive assembly, pulley 34 screws downwardly on shaft 14 until it abuts cap screw 67. Further rotation of pulley 34 imparts the same direction of rotary movement to shaft 14 which oscillates agitator 13 through the motion converting mechanism housed within casing 12. Tub 10, which is connected to shaft 15 through casing 12, is restrained against any rotary or oscillatory movement due to the continuing braking engagement existing between rotor 45 and stator 49.

During the fluid extraction period when motor 31 is reversed and the pulley 34 is rotated in a clockwise direction as viewed from the bottom of the assembly, pulley 34 rotates clockwise relative to shaft 14 and climbs helix 59. It should be noted at this point that the relative rotation between pulley 34 and shaft 14 is possible because of the inertia offered by the agitator mechanism connected to shaft 14.

While clutch member 61 remains in a centered position at all times because of the centering action of balls 65 and inner race 66 which support it, member 61 does not contact rotor 45 when no power is supplied to motor 31 or when pulley 34 is seated against cap screw as shown in Figure 4. However, during the fluid extraction period when pulley 34 is screwed upwardly on helix 59, clutch member 61 slides axially on flat 58 as pulley 34 moves balls 65 upwardly against central portion 63. This causes the clutch member 61 to engage and lift rotor member 45 away from stator 49 against the action of compression spring 46.

While pulley 34 rotates relative to shaft 14 when climbing helix 59, no rotary movement is imparted to member 61 on shaft 14. However, when member 61 is prevented from travelling upwardly because of its abutting the lower end of shaft 15, pulley 34 attempts to wedge itself in helix 59 and against balls 65. This not only drives shaft 14 but also creates a power path from pulley 34 through shaft 14, flat 58 and clutch member 61. Further rotation of pulley 34 in a clockwise direction causes clutch member 61 to rotate rotor 45 through the frictional coupling between these latter two members. This turns outer shaft 15 in unison with the inner shaft 14 to spin tub 10 in the basket 11 during the centrifuging operation.

At the end of the spin dry period when there is an interruption of power to motor 31 and a corresponding cessation of clockwise driving power to rotating pulley 34, pulley 34 tends to reduce its clockwise rotational speed. However, the inertia of the rotating tub assembly tends to maintain the rotation of shafts 14 and 15 at their driven speed. This causes relative rotation between pulley 34 and the spinning unit formed from members 14, 15, 45, and 61 so that pulley 34 actually rotates counterclockwise relative to these parts. This in turn causes pulley 34 to spiral downwardly on helix 59 and decrease its upwardly directed force exerted on rotor 45 through balls 65 and clutch member 61. When the upwardly directed force acting on rotor 45 is decreased, spring 46 then pushes rotor 45, clutch member 61 and balls 65 downwardly in an attempt to again establish a state of equilibrium for rotor member 45. This downward movement of pulley 34 causes rotor 45 to engage stator 49 and also separates driving connection between clutch member 61 and rotor 45.

The engagement of brake lining 48 on rotor 45 with surface 52 of stator 49 quickly stops the rotation of shaft 15 and the tub assembly connected to that shaft. It should be noted that the braking action between the rotor 45 and stator 49 tends to tighten the threaded engagement between umbrella member 16 and stator support member 42 due to the use of right hand threads 43 connecting parts 16 and 42. In addition, it should be apparent that the moment tending to turn stator 49 and umbrella member 16 is resisted by the frictional forces between umbrella member 16 and friction pads 17 and by the anchoring action of springs 19. Shaft 14 also comes to a quick stop once it has been disconnected from shaft 15 permitting the drag forces of pulley 34 and motor 31 to slow it down.

Through the use of this tiltable support mechanism and the cooperating Goodlaxson drive assembly shafts 14 and 15 may be nutated on dome member 18 at all times while shaft 15 may be rotated only during the clockwise rotation of pulley 34 by motor 31. It provides a flexible tiltable support for the tub assembly in addition to a means preventing any oscillation of tub 10 during the agitation period.

While only one embodiment of our invention has been shown in the accompanying drawings, it is understood that modifications of this embodiment may be made without departing from the scope of the invention as set forth in the following claims.

We claim:

1. A support assembly comprising, a frame, a mounting dome on said frame, a support member mating with and supported by said dome, friction means between said dome and said support member, a rotatable shaft mounted on said support member, and resilient means connected between said support member and said frame for centering said support member on said dome, said resilient means including a plurality of spring members biasing said support member against said friction means so as to cooperate with the weight supported by said support member in producing frictional forces resisting relative movement between said support member and said frame.

2. A support assembly comprising, a frame, a mounting dome on said frame, a support member mating with and supported by said dome, friction means between said dome and said support member, a rotatable shaft mounted on said support member, a plurality of centering springs connected to said support member, anchor members pivoted on said frame and fastened to each of said springs, and anchor means for fastening said anchor members to said frame against the urging of said springs.

3. A support assembly comprising, a frame, a depression in said frame, a mounting dome rising from said depression, a support member mating with and supported on said mounting dome, friction means between said support member and said mounting dome resisting relative movement therebetween, a vertical shaft revolvably mounted on said support member, a plurality of anchor members pivoted on said frame for movement toward and away from said shaft, a spring connected between each of said anchor members and said support member and urging said anchor members towards said shaft, and anchor means for attaching said anchor members to said frame against the urging of said springs.

4. A support assembly comprising, a revoluble shaft positioned on a vertical axis, a driving member mounted on said shaft and lying in a horizontal plane intersecting said vertical axis, a frame including a mounting dome forming a spherical segment the radii of curvature of which intersect each other at the point of intersection of said horizontal plane and said vertical axis, a support member mating with and supported on said dome, friction means between said support member and said dome, means supporting said shaft on said support member, and resilient means connected between said frame and said support member for centering said support member on said dome, said resilient means including a plurality of spring members biasing said support member against said friction means so as to cooperate with the weight supported by said support member in producing frictional forces resisting relative movement between said support member and said frame.

5. A support assembly comprising, a revoluble shaft positioned on a vertical axis, a driving member mounted on said shaft and lying in a horizontal plane intersecting said vertical axis, a frame including a dome provided with a spherical segment the radii of curvature of which intersect each other at the point of intersection of said horizontal plane and said vertical axis, a support member mating with and supported by said dome, friction means between said dome and said support member resisting relative movement therebetween, means supporting said shaft on said support member, a plurality of brackets each pivoted on said frame for movement toward and away from said shaft, a spring connected between each of said brackets and said support member and urging each of said brackets toward said shaft, and anchor means connected to said frame and each of said brackets in opposition of the urging of said springs.

6. A support assembly comprising, a base frame, a dome on said base frame, a support member mating with and supported by said dome, a thrust bearing carried by said support member, a shaft supported by and mounted for rotation in said thrust bearing, a plurality of springs connected to said support member to position said shaft for nutational movements about a vertical axis, and anchor means pivoted on said base frame and connected between said base frame and said springs for regulating the degree of relative movement between said dome and said support member.

7. A support assembly comprising, a unitary base frame having formed therein a concave portion and a dome rising from said concave portion, a support member mating with and supported by said dome, friction means between said dome and said support member resisting relative movement therebetween, a thrust bearing carried by said support member, a shaft supported by and mounted for rotation in said thrust bearing, a plurality of springs connected to said support member to position said shaft for nutational movement about a vertical axis, and anchor means pivoted on said base frame and connected to said springs for regulating the degree of relative movement between said dome and said support member.

8. A support assembly comprising a unitary base frame having formed therein a concave depression and a mounting dome rising from said concave depression and provided with an opening through said dome, a support member mating with and supported by said dome, friction means resisting relative movement between said dome and said support member, a thrust bearing carried by said support member, a shaft extending through said opening and supported in said thrust bearing for rotary and nutational movements about a vertical axis, and a plurality of springs connected between said support member and said base frame for centering said support member on said dome.

9. A support assembly comprising, a unitary base frame having formed therein an invaginated conical portion and a dome rising from said invaginated conical portion, an opening in said dome, a support member mating with and supported by said dome, friction means between said support member and said dome resisting relative movement therebetween, a thrust bearing carried by said support member, a shaft journalled in said thrust bearing and extending through said opening in said dome, and a plurality of springs connected between said support member and said base frame to position said shaft for nutational movements about a vertical axis.

10. A support assembly comprising, a unitary base frame including an upstanding conical portion provided with a centrally-located depression and a hemispherical mounting dome rising from the center of said depression, friction means on said dome, a damper member seated on said friction means and provided with a mating spherical surface accommodating relative movement between said damper member and said dome, a thrust bearing in said damper, an upstanding shaft journaled in said thrust bearing to provide a means for positioning said shaft as well as a means for transmitting the weight supported by said shaft to said friction means in order to produce frictional forces opposing relative movement between said damper member and said dome, and a resilient system interconnecting said base frame and said damper member for maintaining said shaft in an upstanding position.

11. A support assembly, comprising a unitary base frame including an upstanding conical portion provided with a centrally-located depression and a truncated hemispherical dome rising from the center of said depression, friction means on said dome, a damper member seated on said friction means and provided with a mating spherical surface accommodating relative movement between said damper member and said dome, an upstanding shaft journaled in said damper member and extending through said truncated dome, a horizontal driving member mounted on said shaft and lying in a plane intersecting the axis of said shaft at the point of intersection of the radii of curvature of said spherical surface, and a resilient system interconnecting said base frame and said damper member for maintaining said shaft in an upstanding position.

12. A support assembly comprising, a unitary base frame including an upstanding conical portion provided with a centrally-located generally concave depression and a hemispherical dome rising from the center of said depression, friction means mounted on said dome, a support member resting on said friction means and provided with a mating spherical surface accommodating relative movement between said support member and said dome, an upstanding revoluble shaft supported on said support member, and a resilient centering system interconnecting said base frame and said support member for maintaining said shaft in an upstanding position.

13. A support assembly comprising, a one-piece base frame including an upstanding conical portion provided with a centrally-located depression and a truncated mounting dome rising from the center of said depression, friction pads on said dome, a damper member seated on said friction pads and provided with a mating spherical surface accommodating relative movement between said damper member and said dome, a thrust bearing in said damper, an upstanding shaft extending through said truncated dome and journaled in said thrust bearing to provide a means for positioning said shaft in an upstanding position and transmitting the vertical loads of said shaft to said damper member to produce frictional forces resisting relative movement between said damper member and said dome, a drive member carried on said shaft and lying in a plane intersecting the rotational axis of said shaft at a point constituting the point of intersection of the radii of curvature of said spherical surface, a plurality of centering springs connected to said damper member and extending radially from said damper member, anchor members respectively connected to each of said springs and pivoted on said base frame for movement toward and away from said shaft, and anchor means connected to said anchor members and to said base frame for anchoring said springs to said base frame.

References Cited in the file of this patent
UNITED STATES PATENTS

| | | |
|---|---|---|
| 765,038 | Ohlsson | July 12, 1904 |
| 1,015,434 | Gray | Jan. 23, 1912 |
| 2,645,108 | Smith | July 14, 1953 |